United States Patent Office 3,218,282
Patented Nov. 16, 1965

3,218,282
ALKALI SOLUBLE RESINS DERIVED FROM A MONOVINYL AROMATIC ALLYL POLYOL AND A DICARBOXYLIC ANHYDRIDE
Daniel J. Kay, Buffalo, N.Y., assignor to Hooker Chemical Corporation, Niagara Falls, N.Y., a corporation of New York
No Drawing. Filed Nov. 30, 1962, Ser. No. 241,163
12 Claims. (Cl. 260—29.6)

This invention relates to ammonia-soluble resins for use in emulsion polish systems and to a process for producing such resins. In another aspect the invention relates to improved emulsion polish systems.

Emulsion polishes usually comprise the following components: synthetic waxy polymer, ammonia-soluble resin, an emulsifying agent and a diluent comprising water and a basic component such as ammonia or organic amines. The waxy component is dispersed in the water with the aid of the emulsifying agent and the basic component. The resin should be soluble in the basic emulsion system wherein it serves to improve the gloss and hardness of the polish and functions as a binder and leveling agent for the waxy component. A number of polymers have been used as the ammonia-soluble resins such as rosin, maleic acid and fumaric acid condensation products of rosin, maleic anhydride and fumaric acid condensation products of polyhydric compounds, shellac and casein. Many of the resins used in the prior art have imparted a dark color to the finished polish and hence, have resulted in the darkening of the surfaces, such as wood floors and composition floors such as linoleum, rubber, vinyl tile and the like, on which the polish is applied. Likewise, resins used heretofore have not imparted sufficient water resistance to the emulsion polishes.

Accordingly, it is an object of this invention to provide an improved ammonia-soluble resin for use in emulsion systems, as well as a process for producing such a resin. Another object of the invention is to provide an emulsion resin that is very light in color. A further object of the invention is to provide an emulsion polish having superior water resistance and excellent gloss and hardness. Yet another object of the invention is to provide an emulsion polish with greatly improved storage stability. Still another object of the invention is to provide an emulsion resin that serves as a superior leveling agent in an emulsion polish. Other objects and advantages will become apparent upon inspection of this specification.

In accordance with this invention there are provided superior alkali-soluble resins suitable for use in emulsion polish systems, comprising an alkali soluble poymerized partial ester having monovinyl aromatic allyl groups connected by ester linkages to dicarboxylic acid residues having free carboxylic acid radicals thereon. These resins may be prepared by reacting a polyol derived from monovinyl aromatic and allyl alcohol with certain selected carboxylic anhydrides.

The term residues refers to the balance of a compound after a chemically distinguishing radical has been altered by chemical action. The term group refers to a portion of a compound which in itself has distinguishing characteristics without reference to any characteristic radicals which may be attached.

The preparation of the allyl alcohol monovinyl aromatic copolymer, described in U.S. Patent 2,940,946, may be summarized as involving reacting the allyl alcohol and monovinyl aromatic compound at a temperature between about 100 and about 250 degrees centigrade in the presence of an organic peroxide which decomposes at temperatures in excess of 90 degrees centigrade, there being 10 to 900 parts of allyl alcohol present to one part monovinyl aromatic compound. The preferred monovinyl aromatic is styrene and the resulting polyol has about 5 hydroxyl units per molecule. Suitably, the reaction is effected during a period of 2 to 24 hours, more commonly 2 to 8 hours.

The use of the term "certain selected carboxylic anhydrides" as employed herein is to be understood to mean (A) phthalic anhydride, (B) succinic anhydride, (C) Nadic anhydride (Nadic being the trade name applied to endo-cis-bicyclo(2,2,1)hept - 5 - ene-2,3-dicarboxylic anhydride, (D) methyl nadic anhydride, (E) tetrahydrophthalic anhydride and (F) hexahydrophthalic anhydride. The use of other carboxylic anhydrides may result in resins that are cross-linked, that are gelled, or lack desirable physical properties such as color and hardness. Among the reasons for the superiority of the anhydride over the corresponding acid is the fact that the acid tends to produce darker resins, cross-linking and gelation of the resins and so forth, due in part to the higher temperature required when it is used.

The allyl alcohol-styrene copolymer and selected carboxylic anhydride are reacted in proportions such that the solid resin product has an acid number (milligrams of KOH per gram of resin) from about 70 to about 180. Solid resins having an acid number from about 100 to about 160 are preferred for the preparation of high quality surface coatings. The desired acid number is achieved by reacting from about 3 to 6 moles of carboxylic anhydride with a mole of the polyol described above. The use of two moles of anhydride often yields resins which are partially insoluble in ammonia. With about seven moles of carboxylic anhydride the resulting resins may be unstable solutions in polish formulations.

Dissolving the allyl-styrene copolymer in a hydrocarbon solvent is a convenient way to achieve a more intimate contact with the carboxylic anhydride and also results in a more uniform heat distribution. Suitable solvents include toluol, xylol and methyl amyl ketone.

Any convenient temperature between 20 and 150 degrees centigrade may be employed in preparing the resin of this invention. More desirable is a range between 30 and 125 degrees centigrade so that the resin may be readily formed, yet not discolored by oxidation. The reaction may be carried out under reflux conditions if a temperature in excess of the solvents boiling point is employed.

The final polish composition of the invention contains in addition to the invented resins, polyethylene, ethylenic unsaturated polymers such as polyvinyl chloride, polyacrylic resin or polystyrene, leveling agents, materials to reduce slipperiness, improve gloss, emulsifiers, alkaline material, and water as the polish solvent. Generally the total solids present in the polish ranges from about 6 to about 25 percent by weight of the composition. More usually, the total of the solubilized invented resins-polystyrene-polyethylene present in the polish is from about 9 to about 18 percent by weight of the composition. The remainder of the composition is essentially water.

The invented resins may constitute from about 10 to about 70 percent by weight of the total solids in the polish compositions. Particularly good results are obtained when from about 15 to about 60 percent of the total solids content of the polish are the invented resins. The balance of the total solids is composed of polyethylene and ethylenic unsaturated material such as polystyrene, the amount of polystyrene usually being in excess to the amount of polyethylene present.

In order to afford storage stability of the water emulsion polish composition, it is adjusted to a pH of at least 7 and more usually to a pH from about 7.5 to about 10.

The final water emulsion polish composition of the invention is normally prepared by making a water solution of the resin portion, a water emulsion of the polyethylene portion, and a water emulsion of the polystyrene portion, separately, and then mixing them together to provide the final composition.

The term soluble as employed in this disclosure is intended to include the concept of dispersible material in the solvent as well as complete dissolving of the material in the solvent.

RESIN SOLUTION

A solution of the ammonia-soluble resin is readily prepared for use in a polish emulsion system. In a typical preparation, one hundred parts of the ammonia-soluble resin and five hundred parts of water are charged to an enclosed vessel which will not permit loss of volatile materials. While agitating the mixture in the vessel, about twenty-five parts of a twenty-eight percent ammonium hydroxide solution is added to the mixing vessel and agitation is continued until the solution of the resin is complete. Gentle heating may be employed to speed the solubilization. In the preparation of the resin solution, the ammonia may be replaced in whole or in part by other alkaline materials such as volatile organic amines. Suitable volatile organic amines include the aliphatic and hydroxy aliphatic amines having boiling points below about two hundred degrees centigrade at a pressure of seven hundred and sixty millimeters of mercury, for example morpholine, ethoxypropylamine, 2-amino-2-methyl-1-propanol, ethanolamine, dimethyl ethanolamine, ethylene diamine and triethylamine. The resin solutions generally contain from about 5 to 25 percent solids, preferably about 15 to 20 percent solids.

A typical polyethylene wax emulsion is prepared as follows:

EMULSION A.—POLYETHYLENE WAX 13.9 parts of AC Polyethylene 629, a well-known polyethylene wax manufactured by Allied Chemical Corporation, New York, N.Y., is melted at a temperature not exceeding two hundred and seventy degrees Fahrenheit. To the melted wax, 2.1 parts of oleic acid are added with agitation and the mixture is reheated to two hundred and thirty degrees Fahrenheit and agitated until it is uniformly fluid, whereupon 2.4 parts of morpholine is added. The resulting mixture is reheated to two hundred and fifty degrees Fahrenheit and agitation is continued until a uniform blend is produced. The resulting mixture is added to 81.6 parts of water that is just below the boiling point and the emulsion is quickly cooled to room temperature with agitation.

The polymer emulsion or latice as herebefore noted may contain polystyrene, polyvinyl chloride or polyacrylic resins. Particularly suited to the polish compositions of this invention are those polystyrene resins having a molecular weight of above about five thousand, preferably those having a molecular weight above one-hundred thousand. These aqueous emulsions are used to increase the hardness of the dried film or decrease the cost of the polish composition.

A typical polymer emulsion is prepared as follows:

EMULSION B.—POLYMER 34.9 parts of U-2003 Ubatol, a polystyrene product manufactured by the U.B.S. Chemical Corporation, Cambridge, Mass., are charged into an enclosed mixing vessel. Using moderate agitation there are added to the vessel 11.5 parts of water and mixing is continued until the mixture is uniform, whereupon a solution of polish leveling agents comprising 1.1 parts of dibutyl phthalate and 0.8 parts of trisbutoxyethyl phosphate and 51.6 parts of water is added to the vessel. Agitation is continued for twenty minutes.

The following examples are illustrative of the invention, but are not to be construed as limiting.

Example 1.—Resin preparation

A 1-liter 3-necked flask equipped with a stirrer, inert gas feed, thermometer and vertical water condenser was charged with 287 grams (0.25 mole) of allyl alcohol-styrene copolymer (Polyol X-450, Shell Chemical Co., molecular weight approximately 1100; ave. appx. 5 hydroxyl groups per mole) and 100 grams of xylene. The ingredients in the flask were heated with a mantle to about 100 degrees centigrade to dissolve the solids in the solvent. A charge of 148 grams (1 mole) of phthalic anhydride was added to the flask and heated gradually to a maximum temperature of 130 to 150 degrees centigrade. Xylene and xylene-water azeotrope were collected and the reaction was continued until a removed sample indicated an acid number of 100–115. At this point the solvent trap was removed and a water cooled condenser was attached to the flask in an oblique position. Vacuum was applied on the charge to remove all traces of solvent. A gradual increase in vacuum was continued up to 20″ with a maximum pot temperature of 140 degrees centigrade. At first sign of anhydride sublimation at the top of the flask, the vacuum treatment was discontinued. The resulting resin was rapidly poured into a shallow tray. The brittle resin had a melting point of 103 degrees centigrade, acid number—124, and color (Gardner)—9.

An ammonia solution of this resin at 16% solids (13 cubic centimeters of 28% ammonia per 50 grams resin) showed the following: Gardner-Holdt viscosity—$A_3$; Gardner color—6; pH—8.8; appearance—clear.

Example 2

Using the procedure and reactants of Example 1, a resin was prepared based on 1 mole of allyl alcohol styrene copolymer and 3 moles of phthalic anhydride. The resulting resin had a melting point of 112 degrees centigrade, acid number of 112 and Gardner color No. 9. An ammonia solution of this resin (16 percent solids) had the following properties: Gardner-Holdt viscosity—$A_2$, Gardner color No.—7, pH—9.8, appearance—clear.

Example 3

Using the procedure and reactants of Example 1, a resin was prepared based on 1 mole of allyl alcohol styrene copolymer and 6 moles of phthalic anhydride. The resulting resin had a melting point of 73 degrees centigrade, acid number of 159 and Gardner color No.—16. An ammonia solution of this resin (16 percent solids) had the following properties: Gardner-Holdt viscosity—$A_3$, Gardner color No.—10, pH—8.8, appearance—clear.

Example 4

Using the procedure and mole ratios of Example 1, a resin was prepared based on succinic anhydride and using toluene as a solvent. The resulting resin had a melting point of 75 degrees centigrade, acid number of 148, and Gardner color No. of 2. An ammonia solution of this resin at 16% solids showed the following: (12 cc. of 28% ammonia per 50 grams of resin) Gardner-Holdt viscosity—$A_2$, Gardner color No.—1, pH—8.2, and had a clear appearance.

Example 5

Using the mole ratio and procedure of Example 2, a resin based on Nadic anhydride was prepared. The resulting resin had a melting point of 107 degrees centigrade, an acid number of 122, and a Gardner color No. of 1. An ammonia solution of this resin at 16% solids (12 cc. of 28% ammonia per 50 grams of resin) showed the following: Gardner-Holdt viscosity—$A_2$, Gardner color No.—1, pH—9.7, and appearance—clear.

Example 6 (comparative)

A commercially available polyester resin based on wood rosin and having an acid number of 130 was compared in this example. An ammonia solution of this resin at 16 percent solids showed the following: Gardner-Holdt viscosity—$A_3$, Gardner color No.—10, pH—8.8 and appearance—clear.

Water emulsion coating compositions were prepared for the coating of linoleum tile. In each case, the coating composition was prepared by stirring together the desired amount of polyethylene emulsion and polystyrene emulsion and thereafter adding the ammonia soluble resin portions. If desired, all three components of the coating solutions may be blended simultaneously; however, it has been found convenient to blend the coating compositions in two steps.

The compositions were applied under regular test procedures to the test linoleum tiles and the following observations made on the coating as it was being applied and on the coating after it had dried. The ability of the coating to spread out and to avoid patches of different thicknesses and leveling was observed as the coating was put on the tile. Gloss of the coating was determined as dried without buffing. The ability to resist water spotting after drying was determined. Additionally, the ability of the polish to blend in with previous coat was observed.

Storage stability was determined in accordance with American Society for Testing Materials procedure D1791–60T. Storage at 52 degrees centigrade is considered appropriate to determine equivalent storage stability at 70 degrees Fahrenheit for one year. Included in the rating symbols provided by this test procedure are OK, meaning no visible change, and G. meaning gelled.

TABLE I

| Example No. | Resin solution of Example No. | Parts by weight | | | Gloss | Performance characteristics | | | Stability at 52° C. ASTM D–1791–60T |
|---|---|---|---|---|---|---|---|---|---|
| | | Resin[1] solution | Polyethylene[1] wax emulsion A | Polymer[1] emulsion B | | Leveling | | Water resistance | |
| 7 | 1 | 20 | 10 | 70 | Good | Good | | Good | OK. |
| 8 | 1 | 30 | 10 | 60 | ----do---- | ----do---- | | ----do---- | OK. |
| 9 | 1 | 40 | 10 | 50 | ----do---- | ----do---- | | Fair | OK. |
| 10 | 1 | 50 | 10 | 40 | ----do---- | ----do---- | | ----do---- | OK. |
| 11 | 1 | 60 | 10 | 30 | ----do---- | Fair | | ----do---- | OK. |
| 12 | 1 | 70 | 10 | 20 | ----do---- | Streaks | | Poor | OK. |
| Comparative: | | | | | | | | | |
| 13 | 6 | 40 | 10 | 50 | ----do---- | Good | | Good | OK. |
| 14 | 6 | 50 | 10 | 40 | ----do---- | ----do---- | | ----do---- | G. |

[1] 16 percent solids.

The coating results show that the gloss and leveling properties were equivalent to the control. Additionally, effects due to polish recoating and water resistance were about equivalent, both types being satisfactory. Comparable surface hardness and toughness were indicated by all coatings, which were considered to be satisfactory to withstand continuous wear. Coating compositions containing the resins of this invention were noticeably lighter in color than the coatings based on resin polyesters.

The invented resins show storage stability at higher contents of resin in polish formulations than do polyester resins based on wood rosin.

Various changes and modifications may be made in the method and apparatus of this invention and in the mole ratios of the resins of this invention, certain preferred ones of which have been herein described, without departing from the spirit and scope of this invention.

What is claimed is:

1. A resinous product suitable for preparation of alkaline emulsions which comprises an alkali soluble polymerized partial ester having monovinyl aromatic allyl groups connected by ester linkages to dicarboxylic acid residues selected from the group consisting of residues derived from phthalic anhydride, tetrahydrophthalic anhydride, hexahydrophthalic anhydride, succinic anhydride, endo - cis-bicyclo(2,2,1)hept-5-ene-2,3-dicarboxylic anhydride and methylated endo-cis-bicyclo(2,2,1)hept-5-ene-2,3-dicarboxylic anhydride and mixtures thereof and is characterized by an acid number from about 70 to about 180.

2. A resinous product suitable for preparation of alkaline emulsions which comprises an alkali soluble polymerized partial ester having monovinyl aromatic allyl groups connected by ester linkages to phthalic acid residues, there being about 3 to about 6 ester linkages on the resinous product molecule, said resinous product being characterized by an acid number from about 70 to about 180.

3. A resinous product suitable for preparation of alkali emulsions which comprises an alkali soluble polymerized partial ester having monovinyl aromatic allyl groups connected by ester linkages to hexahydrophthalic acid residues, there being about 3 to about 6 ester linkages on the resinous products molecule, said resinous product being characterized by an acid number from about 70 to about 180.

4. An ammonia soluble resin containing the esterified residues of (A) a polyhydroxyl obtained by polymerizing allyl alcohol and a monovinyl aromatic in the presence of a free radical catalyst and (B) an organic anhydride selected from the group consisting of phthalic anhydride, tetrahydrophthalic anhydride, hexahydrophthalic anhydride, succinic anhydride, endo-cis-bicyclo(2,2,1)hept-5-ene, 2,3-dicarboxylic anhydride, methylated endo-cis-bicyclo(2,2,1)hept - 5 - ene-2,3-dicarboxylic anhydride and mixtures thereof, and is characterized by an acid number from about 70 to about 180.

5. An ammonia soluble resin containing the esterfied residues (A) a polyhydroxyl obtained by polymerizing allyl alcohol and a monovinyl aromatic in the presence of a free radical catalyst and (B) phthalic anhydride in the ratio of one part polyhydroxyl residue to about three to about six parts of phthalic anhydride and having an acid number from about 70 to about 180.

6. An ammonia soluble resin containing the esterified residues of (A) a polyhydroxyl obtained by polymerizing allyl alcohol and a monovinyl aromatic in the presence of a free radical catalyst and (B) hexahydrophthalic anhydride in the ratio of one mole polyhydroxyl residue to about three to about six moles of hexahydrophthalic anhydride and having an acid number from about 70 to about 180.

7. A water emulsion coating composition comprising essentially polyethylene, polystyrene, a solid resin, emulsifier and water, said resin and mixture of polyethylene and polystyrene being present in a weight ratio from about 10:90 to about 70:30 and where said resin contains the esterified residues of (A) a polyhydroxyl obtained by polymerizing allyl alcohol and a monovinyl aromatic in the presence of a free radical catalyst and (B) aromatic carboxylic acids and anhydrides and is characterized by an acid number from 70 to about 180, said coating composition having a pH of at least 7.

8. An aqueous emulsion coating composition according to claim 7 wherein the aromatic anhydride is selected from the group consisting of phthalic anhydride, tetrahydrophthalic anhydride, hexahydrophthalic anhydride, succinic anhydride, endo-cis-bicyclo (2,2,1)hept-5-ene- 2,3-dicarboxylic anhydride and methylated endo-cis bicylco (2,2,1)hept-5-ene-2,3-dicarboxylic anhydride.

9. An aqueous emulsion coating composition according to claim 7 wherein the aromatic anhydride is phthalic anhydride.

10. An aqueous emulsion coating composition according to claim 7 wherein the aromatic anhydride is hexahydrophthalic anhydride.

11. An ammonia soluble resin containing the esterified residues of (A) a polyhydroxyl obtained by polymerizing allyl alcohol and a monovinyl aromatic in the presence of a free radical catalyst and (B) succinic anhydride in the ratio of one part polyhydroxyl residue to about three to about six parts of succinic anhydride and having an acid number from about 70 to about 180.

12. An ammonia soluble resin containing esterified residues of (A) a polyhydroxyl obtained by polymerizing allyl alcohol and a monovinyl aromatic in the presence of a free radical catalyst and (B) endo-cis-bicyclo-(2.2.1)-hept-5-ene anhydride in the ratio of one part polyhydroxyl residue to about three to about six parts of endo-cis-bicyclo-(2.2.1)-hept-5-ene anhydride and having an acid number from about 70 to about 180.

No references cited.

MURRAY TILLMAN, *Primary Examiner.*